US007933775B2

(12) United States Patent
Quibria et al.

(10) Patent No.: US 7,933,775 B2
(45) Date of Patent: Apr. 26, 2011

(54) METHOD OF AND SYSTEM FOR PROVIDING ADAPTIVE RESPONDENT TRAINING IN A SPEECH RECOGNITION APPLICATION BASED UPON THE INHERENT RESPONSE OF THE RESPONDENT

(75) Inventors: Nasreen Quibria, Newton, MA (US); Lucas Merrow, North Andover, MA (US); Oleg Boulanov, Beverly, MA (US); John P. Kroeker, Hamilton, MA (US); Alexandra Drane, Winchester, MA (US)

(73) Assignee: Eliza Corporation, Beverly, MA (US)

( * ) Notice: Subject to any disclaimer, the term of this patent is extended or adjusted under 35 U.S.C. 154(b) by 0 days.

(21) Appl. No.: 11/273,528

(22) Filed: Nov. 14, 2005

(65) Prior Publication Data

US 2006/0122833 A1    Jun. 8, 2006

Related U.S. Application Data

(63) Continuation of application No. 09/978,611, filed on Oct. 16, 2001, now abandoned.

(60) Provisional application No. 60/241,757, filed on Oct. 16, 2000.

(51) Int. Cl.
G10L 21/00   (2006.01)
G10L 15/00   (2006.01)
(52) U.S. Cl. ................. 704/270; 704/231; 704/270.1
(58) Field of Classification Search .................. None
See application file for complete search history.

(56) References Cited

U.S. PATENT DOCUMENTS

| 4,667,065 A | 5/1987 | Bangerter | 379/351 |
| 4,797,910 A | 1/1989 | Daudelin | 379/67 |
| 4,941,168 A | 7/1990 | Kelly, Jr. | 379/69 |

(Continued)

FOREIGN PATENT DOCUMENTS

EP    0895396    2/1999

(Continued)

OTHER PUBLICATIONS

Kamm, C. et al., "The Role of Speech Processing in Human-Computer Intelligent Communication", Speech Communication, Elsevier Science Publishers, Amsterdam, NL, vol. 23, No. 4, Dec. 1, 1997, pp. 263-278, ISSN:0167-6393.

(Continued)

Primary Examiner — Matthew J Sked
(74) Attorney, Agent, or Firm — McDermott Will & Emery, LLP

(57) ABSTRACT

A system for conducting a telephonic speech recognition application includes an automated telephone device for making telephonic contact with a respondent and a speech recognition device which, upon the telephonic contact being made, presents the respondent with at least one introductory prompt for the respondent to reply to; receives a spoken response from the respondent; and performs a speech recognition analysis on the spoken response to determine a capability of the respondent to complete the application. If the speech recognition device, based on the spoken response to the introductory prompt, determines that the respondent is capable of competing the application, the speech recognition device presents at least one application prompt to the respondent. If the speech recognition device, based on the spoken response to the introductory prompt, determines that the respondent is not capable of completing the application, the speech recognition system presents instructions on completing the application to the respondent.

10 Claims, 5 Drawing Sheets

U.S. PATENT DOCUMENTS

| | | | | |
|---|---|---|---|---|
| 5,163,083 A * | 11/1992 | Dowden et al. | | 379/88.03 |
| 5,404,400 A | 4/1995 | Hamilton | | 379/386 |
| 5,430,792 A | 7/1995 | Jesurum et al. | | 379/67 |
| 5,488,652 A | 1/1996 | Bielby et al. | | 379/88 |
| 5,499,288 A | 3/1996 | Hunt et al. | | 379/88 |
| 5,649,057 A | 7/1997 | Lee et al. | | 395/2.65 |
| 5,787,151 A | 7/1998 | Nakatsu et al. | | 379/67 |
| 5,797,124 A | 8/1998 | Walsh et al. | | 704/275 |
| 5,828,731 A | 10/1998 | Szlan et al. | | 379/88 |
| 5,832,063 A | 11/1998 | Vysotsky et al. | | 379/88 |
| 5,953,393 A | 9/1999 | Culbreth et al. | | 379/88.25 |
| 5,960,063 A | 9/1999 | Kuroiwa et al. | | 379/88.01 |
| 5,982,875 A * | 11/1999 | Lieben et al. | | 379/350 |
| 5,987,414 A | 11/1999 | Sabourin et al. | | 704/270 |
| 6,044,347 A | 3/2000 | Abella et al. | | 704/272 |
| 6,075,844 A | 6/2000 | Goldberg et al. | | 379/88.17 |
| 6,094,632 A | 7/2000 | Hattori | | 704/239 |
| 6,101,468 A * | 8/2000 | Gould et al. | | 704/251 |
| 6,334,103 B1 * | 12/2001 | Surace et al. | | 704/257 |
| 6,374,225 B1 * | 4/2002 | Hejna, Jr. | | 704/270 |
| 6,560,576 B1 * | 5/2003 | Cohen et al. | | 704/270 |
| 6,604,075 B1 * | 8/2003 | Brown et al. | | 704/270.1 |
| 6,704,410 B1 * | 3/2004 | McFarlane et al. | | 379/265.05 |
| 6,944,592 B1 * | 9/2005 | Pickering | | 704/251 |
| 7,143,039 B1 * | 11/2006 | Stifelman et al. | | 704/270 |
| 2001/0047261 A1 * | 11/2001 | Kassan | | 704/270 |

FOREIGN PATENT DOCUMENTS

WO    WO 9850907    11/1998

OTHER PUBLICATIONS

Takahashi, J. et al., "Interactive Voice Technology Development for Telecommunications Applications", Speech Communication, Elsevier Science Publishers, Amsterdam, NL, vol. 17, No. 3, Nov. 1, 1995, pp. 287-301, ISSN: 0167-6393.

* cited by examiner

METHOD OF AND SYSTEM FOR PROVIDING ADAPTIVE RESPONDENT TRAINING IN A SPEECH RECOGNITION APPLICATION BASED UPON THE INHERENT RESPONSE OF THE RESPONDENT

CROSS REFERENCES TO RELATED APPLICATIONS

This application claims the benefit of priority from commonly owned U.S. Provisional Patent Application Ser. No. 60/241,757, filed Oct. 16, 2000, entitled ADAPTIVE USER. TRAINING FOR SPEECH RECOGNITION APPLICATION, and is a continuation of U.S. patent application Ser. No. 09/978,611 filed Oct. 16, 2001 now abandoned.

FIELD OF THE INVENTION

The present invention relates generally to a method of and system for providing adaptive respondent training in a speech recognition algorithm, and more particularly to a method of and system for determining the level of understanding and capability of a respondent to a telephonic speech recognition application, and both providing specific instructions to the respondent regarding the application and adapting the application to suit the capabilities of the respondent.

BACKGROUND OF THE INVENTION

In the new, connected economy, it has become increasingly important for companies or service providers to become more in tune with their clients and customers. Such contact can be facilitated with automated telephonic transaction systems, in which interactively-generated prompts are played in the context of a telephone transaction, and the replies of a human user are recognized by an automatic speech recognition system. The answers given by the respondent are processed by the system in order to convert the spoken words to meaning, which can then be utilized interactively, or stored in a database.

In order for a computer system to recognize the words that are spoken and convert these words to text, the system must be programmed to phonetically break down the words and convert portions of the words to their textural equivalents. Such a conversion requires an understanding of the components of speech and the formation of the spoken word. The production of speech generates a complex series of rapidly changing acoustic pressure waveforms. These waveforms comprise the basic building blocks of speech, known as phonemes. Vowel and consonant sounds are made up of phonemes and have many different characteristics, depending on which components of human speech are used. The position of a phoneme in a word has a significant effect on the ultimate sound generated. A spoken word can have several meanings, depending on how it is said. Speech scientists have identified allophones as acoustic variants of phonemes and use them to more explicitly define how a particular word is formed.

While there are several distinct methods for analyzing the spoken word and extracting the information necessary to enable the recognition system to convert the speech to wordstrings, including Hidden Markov modeling and neural networks, these methods generally perform similar operations. The differences in these methods are typically in the manner in which the system determines how to break the phonetic signal into portions that define phonemes. Generally, a speech recognition system first converts an incoming analog voice signal into a digital signal. The second step is called feature extraction, wherein the system analyzes the digital signal to identify the acoustic properties of the digitized signal. Feature extraction generally breaks the voice down into its individual sound components. Conventional techniques for performing feature extraction include subband coding Fast Fourier Transforms and Linear Predictive Coding. Once the signal has been analyzed, the system then determines where distinct acoustic regions occur. The goal of this step is to divide the acoustic signal into regions that will be identified as phonemes which can be converted to a textual format. In isolated word systems, this process is simplified, because there is a pause after each word. In continuous speech systems, however, this process is much more difficult, since there typically are no breaks between words in the acoustic stream. Accordingly, the system must be able not only to break the words themselves into distinct acoustic regions, but must also be able to separate consecutive words in the stream. It is in this step that conventional methods such as Hidden Markov modeling and neural networks are used. The final step involves comparing a specific acoustic region, as determined in the previous step, to a known set of templates in a database in order to determine the word or word portion represented by the acoustic signal region. If a match is found, the resulting textual word is output from the system. If one is not, the signal can either be dynamically manipulated in order to increase the chances of finding a match, or the data can be discarded and the system prompted to repeat the query to the respondent, if the associated answer cannot be determined due to the loss of the data.

In customer service applications, it is important for service providers to be able to obtain information from, or to provide information to, their customers. Oftentimes, service providers will need to contact customers via the telephone to obtain or provide the desired information. In order to reduce the costs associated with such information exchanges, many service providers utilize automated telephone calling devices to contact customers. While the automated telephone calling devices are extremely capable of converting spoken words into text phrases and thereby obtaining valuable information from respondents, in some cases, the respondents are not capable of providing adequate responses to the posed questions, or do not understand what is involved in an automated telephonic application. Prior art speech recognition applications are not able to identify that the respondent is having trouble with the application and then adjust the application accordingly. This results in wasted time and money for the company in charge of the survey and in frustration on the part of the respondent.

SUMMARY OF THE INVENTION

The present invention is directed to a method for adaptive training of a respondent to a telephonic speech recognition application. The method is used in connection with the speech recognition application to enable the administrator of the application to explain the function of the application, to train the respondent in how to effectively respond to the queries in the application and to adapt the application to the needs of the respondent, based on the initial responses given by the respondent.

BRIEF DESCRIPTION OF THE DRAWINGS

The foregoing and other objects of this invention, the various features thereof, as well as the invention itself may be more fully understood from the following description when read together with the accompanying drawings in which.

DETAILED DESCRIPTION

As set forth above, many customer-oriented organizations, including retail operations, service organizations, health care organizations, etc. rely on interactions with their customers in order to obtain valuable information that will enable the organizations to optimize their operations and to provide better service to the customers. Telephonic speech recognition applications, in which specific prompts about the organization's products or services, enable the organizations to obtain information from customers in a manner which consumes very little time and which does not require repeat visits to the organization's location. For many organizations, these types of interactions are much less troublesome for customers who might have difficulties in traveling.

While speech recognition applications can be an extremely efficient way to gather information from respondents, if the respondent is not able to respond to the prompts of the survey or does not understand the survey process or how to respond to certain types of queries, the process can be frustrating for respondent, thus inhibiting future interactions with the respondent, and the process can be costly and time consuming for the organization providing the service.

The present invention includes a method and system for determining whether a respondent is capable of responding to the prompts in a telephonic speech recognition application and what extra explanations or instructions, with modified application functionality, might be required to assist the respondent in completing the application. The method is incorporated into the application, and responses to introductory prompts of the application direct the application to present prompts to the respondent that will enable the respondent to learn how to correctly complete the application.

Figure 1:
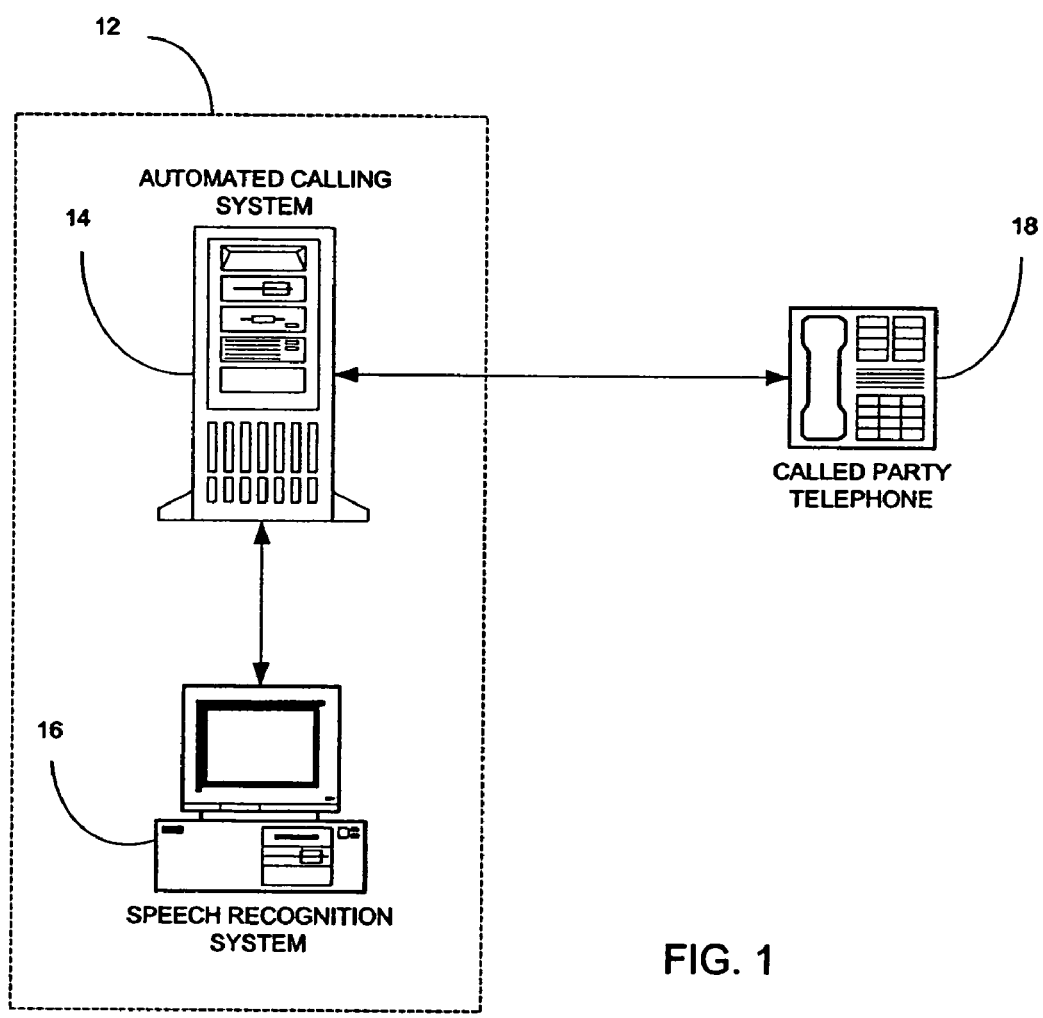
FIG. 1 is a schematic block diagram of the system for providing adaptive respondent training in accordance with the present invention.
Figure 2:
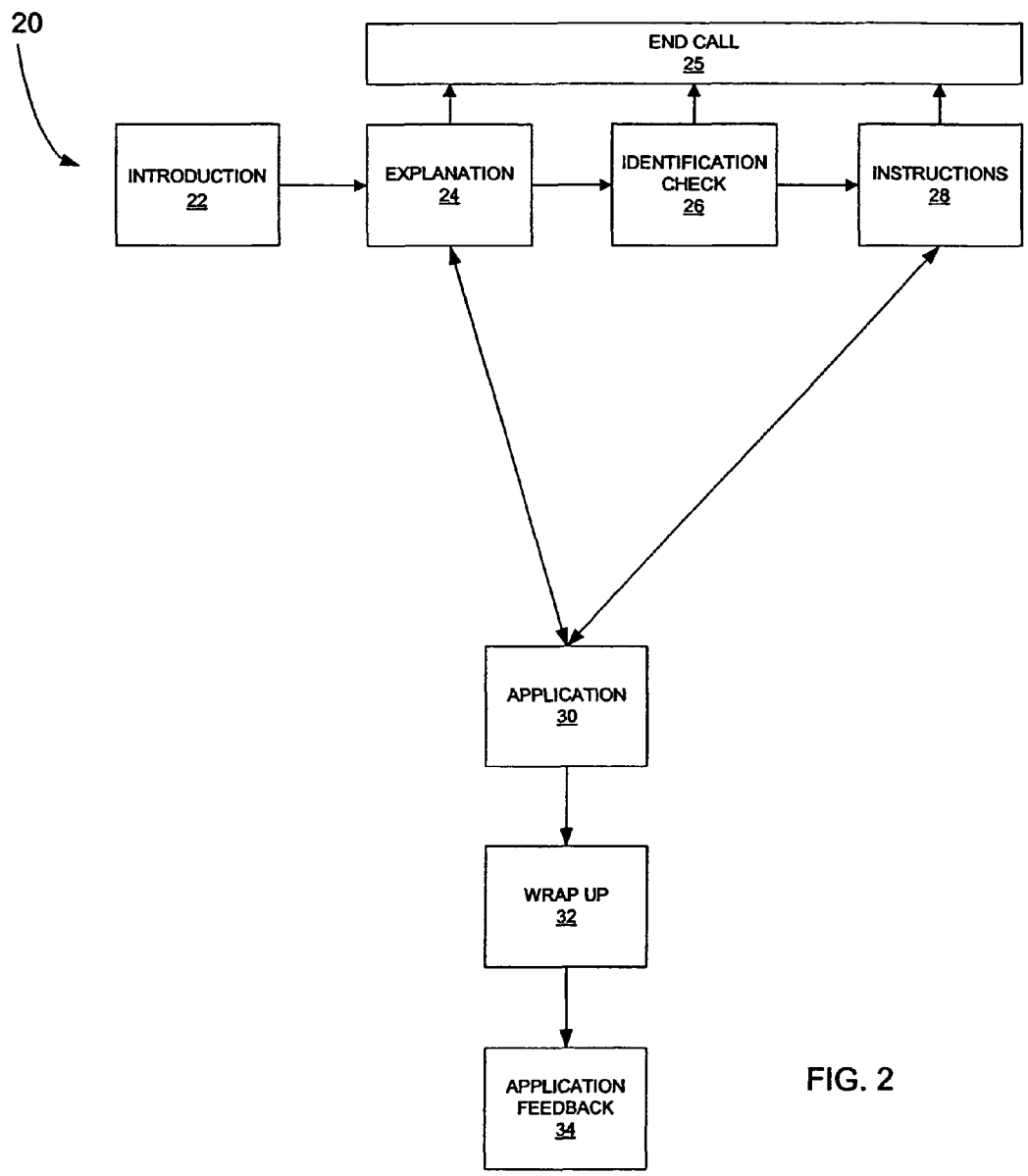
FIG. 2 is a flow diagram of a method for providing adaptive respondent training in accordance with the present invention.
Figure 3A:
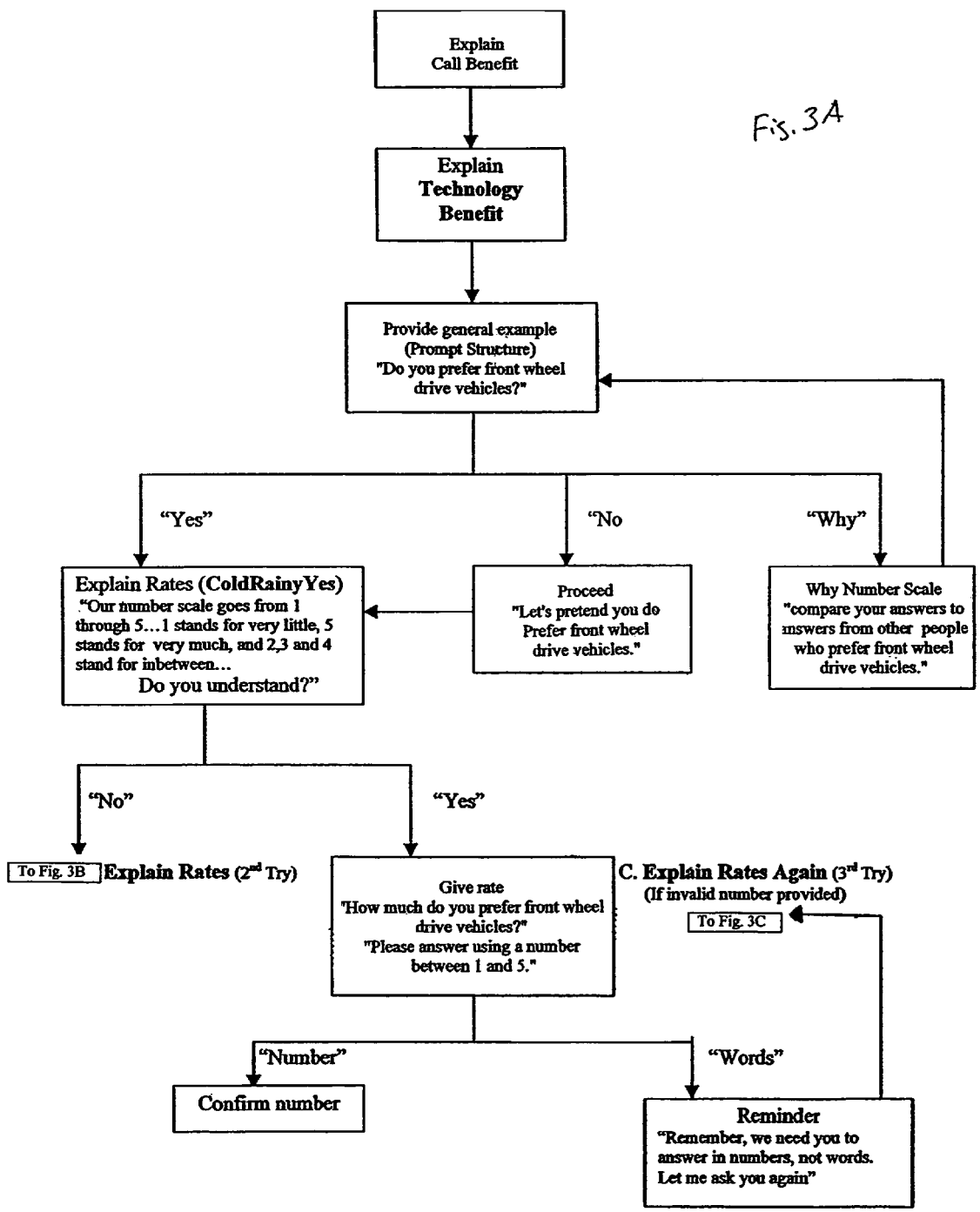
FIGS. 3A-3C are flow diagrams showing an example of the instruction stage of the present invention.
Figure 3B:
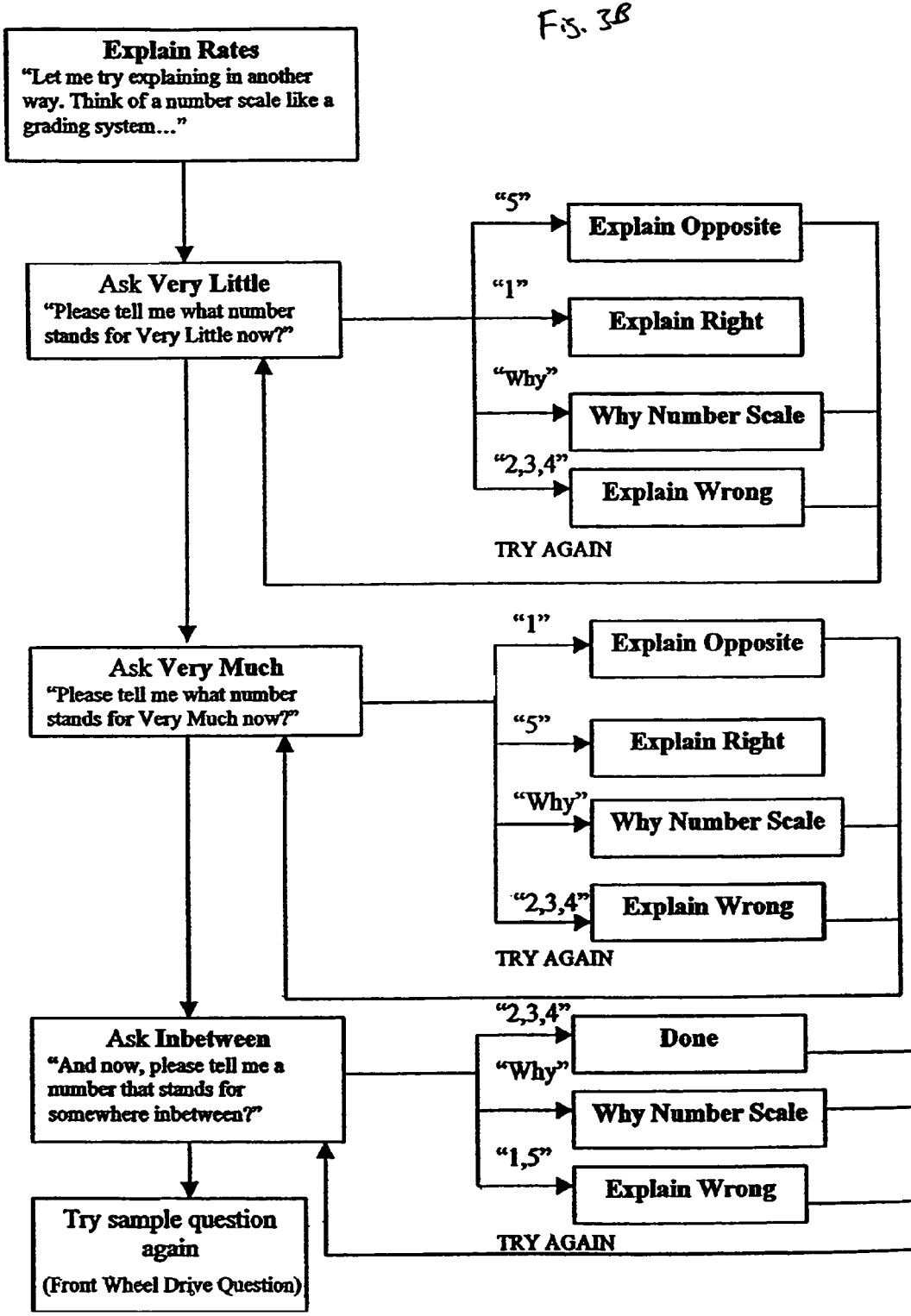
Figure 3C:
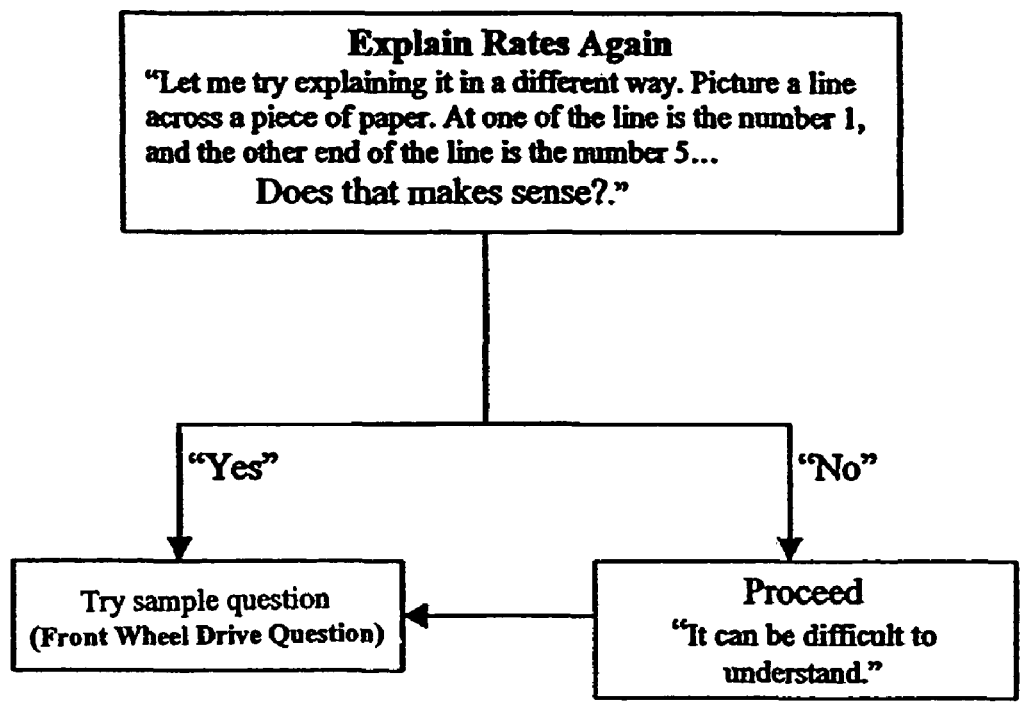

Referring now to FIGS. 1-3, a preferred embodiment of the present invention will be described. System 12, FIG. 1, includes an automated telephone calling system 14 and a speech recognition system 16. Preferably, the automated telephone calling system 14 is a personal computer such as an IBM PC or IBM PC compatible system or an APPLE MacINTOSH system or a more advanced computer system such as an Alpha-based computer system available from Compaq Computer Corporation or SPARC Station computer system available from SUN Microsystems Corporation, although a main frame computer system can also be used. In such a system, all of the components of the system will reside on the computer system, thus enabling the system to independently process data received from a respondent in the manner described below. Alternatively, the components may be included in different systems that have access to each other via a LAN or similar network. For example, the automated telephone calling device 14 may reside on a server system which receives the audio response from a telephone 18 and transmits the response to the speech recognition device 16.

The automated telephone calling system 14 may also include a network interface that facilitates receipt of audio information by any of a variety of networks, such as telephone networks, cellular telephone networks, the Web, Internet, local area networks (LANs), wide area networks (WANs), private networks, virtual private networks (VPNs), intranets, extranets, wireless networks, and the like, or some combination thereof. The system 10 may be accessible by any one or more of a variety of input devices capable of communicating audio information. Such devices may include, but are not limited to, a standard telephone or cellular telephone 18.

Automated telephone calling system 14 includes a database of persons to whom the system 12 is capable of initiating or receiving telephone calls, referred to hereinafter as the "target person", a telephone number associated with each person and a recorded data file that includes the target person's name. Such automated telephone calling devices are known in the art. As is described below, the automated telephone calling system 14 is capable of initiating or receiving a telephone call to or from a target person and playing a prerecorded greeting prompt asking for the target person. The system 14 then interacts with speech recognition system 16 to analyze responses received from the person on telephone 18.

Speech recognition system 16 is an automated system on which a speech recognition application, including a series of acoustic outputs called prompts, which comprise queries about a particular topic, are programmed so that they can be presented to a respondent, preferably by means of a telephonic interaction between the querying party and the respondent. However, a speech recognition application may be any interactive application that collects, provides, and/or shares information. As examples, in the present invention, a speech application may be any of a group of interactive applications, including consumer service or survey applications; Web access applications; customer service applications; educational applications, including computer-based learning and lesson applications and testing applications; screening applications; consumer preference monitoring applications; compliance applications, including applications that generate notifications of compliance related activities, including notifications regarding product maintenance; test result applications, including applications that provide at least one of standardized tests results, consumer product test results, and maintenance results; and linking applications, including applications that link two or more of the above applications.

In the preferred embodiment, each speech recognition application includes an application file programmed into the speech recognition system 16. Preferably, the series of queries that make up the application is designed to obtain specific information from the respondents to aid in customer or consumer service, education and research and development of particular products or services or other functions. For example, a particular speech application could be designed to ask respondents specific queries about a particular product or service. The entity that issues the application may then use this information to further develop the particular product or service. An application may also be used to provide specific information to a particular person or department.

FIG. 2 is a flow diagram which shows the method of adapting a speech recognition application and training a speech recognition application respondent in order to enable the respondent to effectively complete the application. First, either the automatic calling system 14 initiates a call to the target person at telephone 18, or the target person initiates a telephone call to the system 12 based on information provided to the respondent by the organization providing the application. The system 12 initiates the application by providing an introduction to the respondent, stage 22. The introduction generally identifies the host organization and informs the respondent of the purpose of the application.

In stage 24, the system 12 provides a brief explanation of the application, including the fact that the respondent is speaking to a computer that is only capable of posing queries, recognizing certain of the respondent's responses The system then prompts the respondent to affirm that he or she understands how to interact with the system 12. This prompt enables the system 12 to determine if the respondent is capable of interacting with an automated speech recognition system. Based on the response given, the system determines which step will be executed next. If the respondent replies quickly with a "yes" or some similar affirmation, the system may move on to the identification check, stage 26, in which the respondent is asked to provide identification, typically in the form of a personal identification number (PIN), voice verification, or other method. While the use of a PIN is desirable in application surveys that address private matters concerning the respondent, the use of a PIN is not required in the present invention.

If the respondent answers "no" or does not respond to the affirmation request in stage 24, the system 12 explains in greater detail how the system operates. The system prompts the respondent to answer "Hello" to a similar greeting offered by the system, as a training exercise for the respondent. If the respondent replies correctly, the system can repeat the explanation of the system and proceed to the identification stage 26. If the respondent is does not reply to the greeting request or replies with a reply that is not understood by the system 12, the system can initiate several more attempts at, and approaches to trying to explain the process to the respondent, including attempting to determine whether the respondent is having difficulty hearing the application, in which the system 12 would be instructed to increase the volume of the prompts and/or to slow the speed at which the prompts are played by the system 12. If the system is unable to teach the respondent how to respond to the application, the system enters an end call stage 25, in which the respondent is thanked and optionally informed that they will be contacted by a human being, and the call is terminated.

In optional identification stage 26, the respondent is asked for identification, which in one example may include a PIN. If the PIN is correctly input either by speaking the numbers or by pressing the number on the telephone keypad, the application moves to the instruction step 28. If the respondent enters an incorrect PIN or does not know his or her PIN, the system enters an end call stage 25, in which the respondent is thanked and optionally informed how they can obtain a proper PIN, and the call is terminated.

After the identity of the respondent has been confirmed in step 26, the system enters instruction stage 28. In instruction stage 28, the system 12 explains the purpose of the application and the benefits provided by the application. The system 12 explains the structure of the application and informs the respondent of what types of answers are necessary for the application to be successful. The system 12 can then provide a sample prompt to the respondent in order to prepare the respondent for what to expect during the actual application. If the survey includes a rating system, it is explained in this stage and the sample question can require an answer that uses the rating system. An example of this process in shown in FIGS. 3A-3C, which include an example question and the options available, depending on the responses given. If, in this stage, the respondent is unable to answer the sample prompt satisfactorily, the system enters an end call stage 25, in which the respondent is thanked and optionally informed that they will be contacted by a human being, and the call is terminated.

After stage 28 has been completed satisfactorily, the system enters stage 30, in which the prompts of the application are presented to the respondent. At any point during stage 30, if the respondent does not understand the process or becomes confused by the application, prompts or rating system, the system 12 can re-enter either or both of explanation stage 24 and instruction stage 28 to provide help for the respondent, as necessary. The system 12, when appropriate, can then return to survey stage 30 to complete the application. During the application, the system records each of the responses provided by the respondent for review at a later time.

At the completion of the application, the system enters a "wrap up" stage 32 in which the respondent is informed that the survey is over and is thanked by the host organization for participating in the application. Application feedback stage 34 provides an opportunity for the respondent to have his or her comments regarding the application itself or regarding the speech recognition application system recorded for review by the host organization.

Accordingly, the present invention enables the system 12 both to train the respondent in properly responding to the prompts of the associated application and to alter the course of the application based on responses to introductory and explanatory prompts. For example, if the respondent, from the beginning of the call, understands the application process and is capable of responding to the prompts, the explanation stage 24 and instruction stage 28 can be quickly navigated through, saving time and money for the host organization, since more respondents can be processed in a given period of time. On the other hand, if the respondent is having difficulty understanding or hearing the system 12, the system is able to offer further explanations, training and sample prompts and, if the person is still not able to complete the survey, the system 12 is able to terminate the application.

The invention may be embodied in other specific forms without departing from the spirit or essential characteristics thereof. The present embodiments are therefore to be considered in respects as illustrative and not restrictive, the scope of the invention being indicated by the appended claims rather than by the foregoing description, and all changes which come within the meaning and range of the equivalency of the claims are therefore intended to be embraced therein.

The invention claimed is:

1. A method of conducting an automated, telephonic, speaker-independent speech recognition application, comprising:
   A. making telephonic contact with a respondent;
   B. presenting the respondent with at least one introductory speech-generated prompt requesting an audio response from the respondent to initially determine whether the respondent understands how to interact with the automated, telephonic, speaker-independent speech recognition application before generating the application;
   C. utilizing an automated, speaker-independent speech recognition algorithm to analyze the audio response given by the respondent to the introductory speech-generated prompt; and
   D. based on the audio response, automatically adapting the speech recognition application by performing the following steps:
      D1. automatically providing branches for further explanation or instructions;
      D2. automatically providing branches for providing examples or practice sessions; and
      D3. automatically altering the pace or speed of verbal prompts given by the automated, telephonic, speaker-independent speech recognition application.

2. A method of conducting an automated, telephonic, speaker-independent speech recognition application according to claim 1, further comprising automatically generating an explanation of the operation of said speech recognition application including automatically generating a training exercise for the respondent, without the need for human intervention.

3. A method of conducting an automated, telephonic, speaker-independent speech recognition application according to claim 2, further comprising automatically generating a training exercise for the respondent including automatically prompting the respondent to provide a prescribed response.

4. A method of conducting an automated, telephonic, speaker-independent speech recognition application according to claim 3, wherein automatically generating a training exercise for the respondent includes automatically determining whether the respondent provides the prescribed response, and if so, automatically generating the automated, telephonic, speaker-independent speech recognition application, without the need for human intervention.

5. A method of conducting an automated, telephonic, speaker-independent speech recognition application according to claim 3, wherein automatically generating a training exercise for the respondent includes automatically determining whether the respondent provides the prescribed response, and if not, automatically generating an end of call stage.

6. A system for conducting an automated, telephonic speaker-independent speech recognition application, comprising:
an automated telephone device for making telephonic contact with a respondent; and
a speech recognition device which, upon said telephonic contact being made, is configured to present the respondent, prior to conducting the automated, telephonic speaker-independent speech recognition application, with at least one introductory prompt for the respondent to reply to; receive a spoken response from the respondent; and perform a speech recognition analysis on said spoken response to determine the capability of the respondent to complete the application;
wherein said speech recognition device is configured to, if and only if said speech recognition device determines, based on (i) the speech recognition analysis on said spoken response to said introductory prompt, and (ii) the determined capability of the respondent, that the respondent is capable of interacting with and completing said application, automatically present, without the need for human intervention, the automated, telephonic speaker-independent speech recognition application to said respondent; and
automatically provide branches for further explanation or instructions;
automatically provide branches for providing examples or practice sessions; and
automatically alter the pace or speed of verbal prompts given by the automated, telephonic, speaker-independent speech recognition application.

7. A system for conducting an automated, telephonic speaker-independent speech recognition application according to claim 6, wherein if said speech recognition device, based on said spoken response to said introductory prompt, automatically determines that the respondent is not capable of completing said application, said speech recognition system is configured so as to automatically present instructions on completing said application to the respondent including generating a training exercise for the respondent, without the need for human intervention.

8. A system for conducting an automated, telephonic speaker-independent speech recognition application according to claim 7, wherein the training exercise for the respondent automatically generated by said speech recognition system is configured so as to include a prompt to the respondent to provide a prescribed response.

9. A system for conducting an automated, telephonic speaker-independent speech recognition application according to claim 8, wherein the training exercise for the respondent is configured so as to automatically generate the automated, telephonic, speaker-independent speech recognition application if it is determined that the respondent provides the prescribed response.

10. A system for conducting an automated, telephonic speaker-independent speech recognition application according to claim 8, wherein the training exercise for the respondent is configured to automatically generate an end of call stage if it is determined that the respondent does not provide the prescribed response.

* * * * *